(12) United States Patent
Noguchi et al.

(10) Patent No.: US 12,208,473 B2
(45) Date of Patent: Jan. 28, 2025

(54) ARC WELDING CONTROL METHOD AND ARC WELDING DEVICE

(71) Applicant: Panasonic Intellectual Property Management Co., Ltd., Osaka (JP)

(72) Inventors: Takahiro Noguchi, Osaka (JP); Akira Nakagawa, Osaka (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 325 days.

(21) Appl. No.: 17/683,296

(22) Filed: Feb. 28, 2022

(65) Prior Publication Data

US 2022/0266372 A1 Aug. 25, 2022

Related U.S. Application Data

(63) Continuation of application No. PCT/JP2020/048898, filed on Dec. 25, 2020.

(30) Foreign Application Priority Data

Jan. 6, 2020 (JP) ................. 2020-000365

(51) Int. Cl.
   *B23K 9/073* (2006.01)
   *B23K 9/095* (2006.01)
   *B23K 35/38* (2006.01)

(52) U.S. Cl.
   CPC .......... *B23K 9/0732* (2013.01); *B23K 9/0956* (2013.01); *B23K 35/38* (2013.01)

(58) Field of Classification Search
   CPC ...... B23K 9/0732; B23K 9/092; B23K 35/38; B23K 9/0956
   See application file for complete search history.

(56) References Cited

U.S. PATENT DOCUMENTS

2006/0201922 A1* 9/2006 Era ................. B23K 9/092
                                                            219/130.51
2010/0176105 A1   7/2010 Hongu et al.
(Continued)

FOREIGN PATENT DOCUMENTS

| JP | 2003-071590 | 3/2003 |
| JP | 2012-161814 | 8/2012 |

(Continued)

OTHER PUBLICATIONS

International Search Report of PCT application No. PCT/JP2020/048898 dated Mar. 16, 2021.

*Primary Examiner* — Phuong T Nguyen
*Assistant Examiner* — Dilnessa B Belay
(74) *Attorney, Agent, or Firm* — Wenderoth, Lind & Ponack, L.L.P.

(57) ABSTRACT

An arc welding control method is for performing control in an arc period. The control includes: (i) increasing a welding current to a first current value at a first gradient and maintaining the welding current at the first current value for a first period; (ii) reducing the welding current from the first current value to a second current value at a second gradient and maintaining the welding current at the second current value for a second period; (iii) increasing the welding current from the second current value to a third current value at a third gradient; and (iv) starting to reduce the welding current from the third current value within a third period, which is shorter than the first period, after the welding current reaches the third current value.

18 Claims, 3 Drawing Sheets

(56) References Cited

U.S. PATENT DOCUMENTS

| | | |
|---|---|---|
| 2012/0199560 A1 | 8/2012 | Era et al. |
| 2014/0203004 A1* | 7/2014 | Matsuoka ............ B23K 9/0956 219/137 R |
| 2018/0214966 A1 | 8/2018 | Peters |

FOREIGN PATENT DOCUMENTS

| | | |
|---|---|---|
| JP | 2013-013920 | 1/2013 |
| JP | 2013-043213 | 3/2013 |
| JP | 2015-016482 | 1/2015 |
| JP | 2015016482 A * | 1/2015 |
| JP | 2015-030033 | 2/2015 |
| JP | 2018-118314 | 8/2018 |
| WO | 2008/105116 | 9/2008 |
| WO | 2013/145569 | 10/2013 |

* cited by examiner

ARC WELDING CONTROL METHOD AND ARC WELDING DEVICE

CROSS-REFERENCE TO RELATED APPLICATIONS

This application is a continuation of the PCT International Application No. PCT/JP2020/048898 filed on Dec. 25, 2020, which claim the benefit of foreign priority of Japanese patent application No. 2020-000365 filed on Jan. 6, 2020, the contents all of which are incorporated herein by reference.

TECHNICAL FIELD

The present disclosure relates to an arc welding control method and an arc welding device for controlling a welding current in short-circuit arc welding.

BACKGROUND ART

WO 2013/145569 discloses an arc welding control method in which a short-circuit period and an arc period are alternately repeated while a welding wire is fed toward a base material at a constant feeding speed. In this arc welding control method, a welding current at an initial stage of the arc period is increased so that occurrence of a short circuit after the start of the arc period is suppressed to reduce spatter.

SUMMARY OF THE INVENTION

Technical Problem

When a welding current at an initial stage of an arc period is increased as in PTL 1 in arc welding using a shield gas containing a carbon dioxide gas as a main component, there is a problem in that a molten pool greatly vibrates due to an arc force acting on a droplet during globular transfer to cause a micro-short circuit, thereby increasing spatter.

The present disclosure has been made in view of such a point, and an object of the present disclosure is to reduce spatter generated during arc welding using a shield gas containing carbon dioxide as a main component.

Solution to Problem

An aspect of the present disclosure is an arc welding control method for alternately repeating a short-circuit period and an arc period as a main component while feeding a welding wire to a base material at a constant wire feeding speed using a shield gas containing carbon dioxide, the arc welding control method including: starting the arc period by increasing a welding current in the short-circuit period; and performing control in the arc period, the control including: first control of increasing the welding current to a first current value in a range from 200 A to 300 A inclusive at a first gradient and maintaining the welding current at the first current value for a first period: performing second control of reducing the welding current from the first current value to a second current value at a second gradient and maintaining the welding current at the second current value for a second period: performing third control of increasing the welding current from the second current value to a third current value higher than the first current value at a third gradient; and fourth control that is started to reduce the welding current from the third current value within 0.5 ms after the welding current reaches the third current value under the third control.

This aspect enables suppressing vibration of a molten pool generated under the first control using an arc force due to the welding current increased under the third control, so that spatter generated by a micro-short circuit between the molten pool and a droplet can be reduced.

Additionally, the welding current is reduced within 0.5 ms after reaching the third current value, so that amplification of the vibration of the molten pool can be suppressed by the arc force due to the welding current at the third current value.

Advantageous Effect of Invention

The present disclosure enables reduction of spatter generated during arc welding using a shield gas containing carbon dioxide as a main component.

DESCRIPTION OF EMBODIMENT

Hereinafter, an exemplary embodiment of the present disclosure will be described with reference to the drawings. The following description of a preferable exemplary embodiment is merely illustrative in nature and is not intended to limit the present disclosure, and application or use of the present disclosure.

Figure 1:
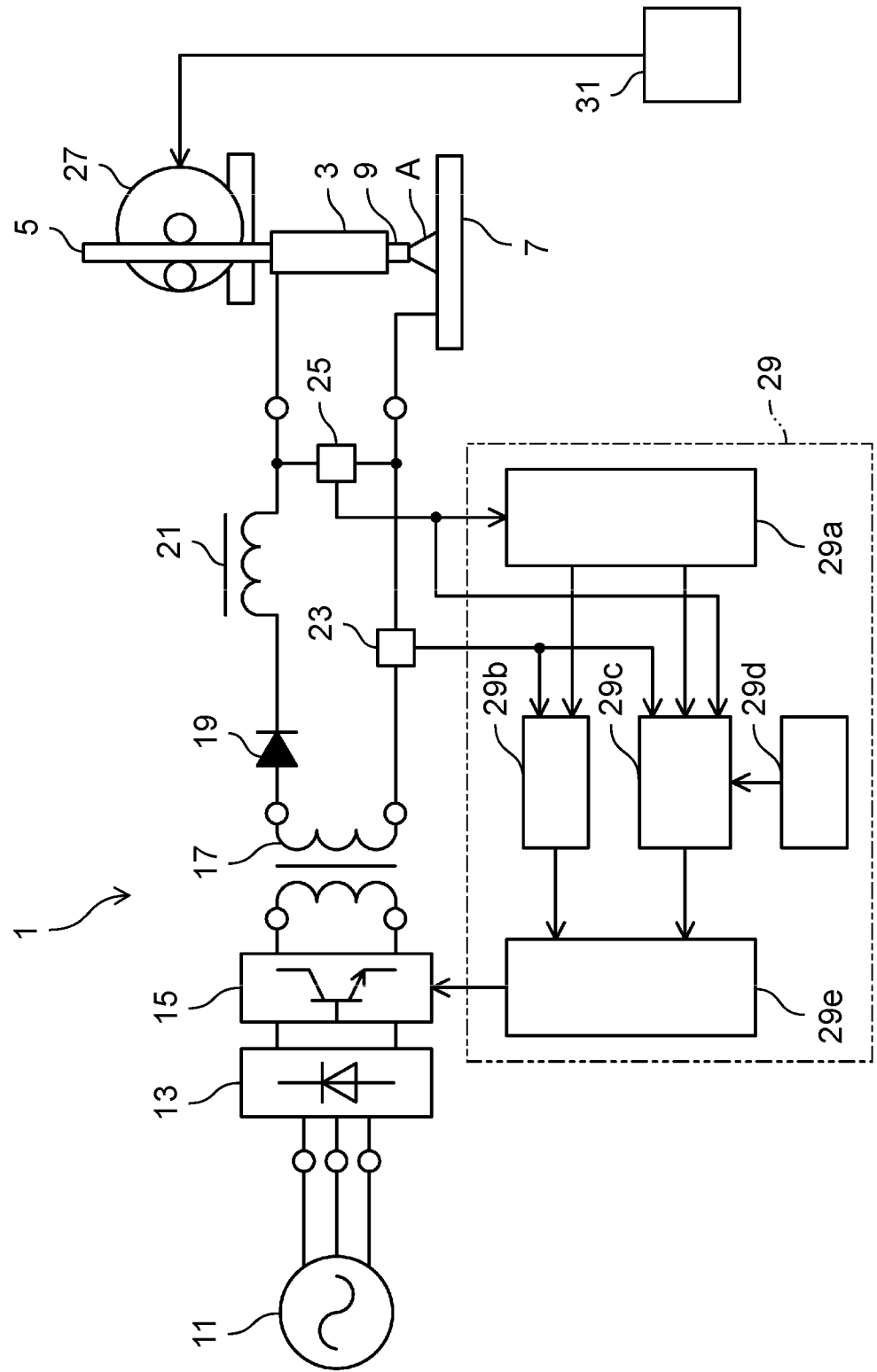
FIG. 1 is a diagram illustrating a schematic configuration of an arc welding device according to an exemplary embodiment of the present disclosure.

FIG. 1 illustrates arc welding device 1 according to the exemplary embodiment of the present disclosure. This arc welding device 1 is a DC welding machine that performs short-circuit arc welding in which a short-circuit period and an arc period are alternately repeated, while feeding welding wire 5 held by torch 3 toward base material 7 at a constant feeding speed. During the short-circuit period, welding wire 5 and base material 7 are short-circuited, and during the arc period, arc A is generated between welding wire 5 and base material 7. Torch 3 is held by an operator. Welding wire 5 is made of soft steel and has a wire diameter (@) of 1.2 mm, for example. As base material 7, a plate made of mild steel, high tensile strength steel, or galvanized steel is used. Base material 7 has a plate thickness set to a range from 3 mm to 12 mm inclusive. As a shield gas to be blown onto base material 7, a gas containing 70% or more carbon dioxide as a main component is used. Torch 3 is provided with tip 9 for supplying power to welding wire 5.

Arc welding device 1 includes AC power supply 11, first rectifier element 13, switching element 15, main transformer 17, second rectifier element 19, reactor 21, current detector 23, voltage detector 25, wire feeder 27, current-voltage controller 29, and wire feeding speed controller 31.

First rectifier element 13 rectifies an output of AC power supply 11.

Switching element 15 adjusts an output of first rectifier element 13 to an output, which is suitable for welding, under control of current-voltage controller 29.

Main transformer 17 converts the output of switching element 15 into the output suitable for welding.

Second rectifier element 19 rectifies the output of main transformer 17.

Figure 2:
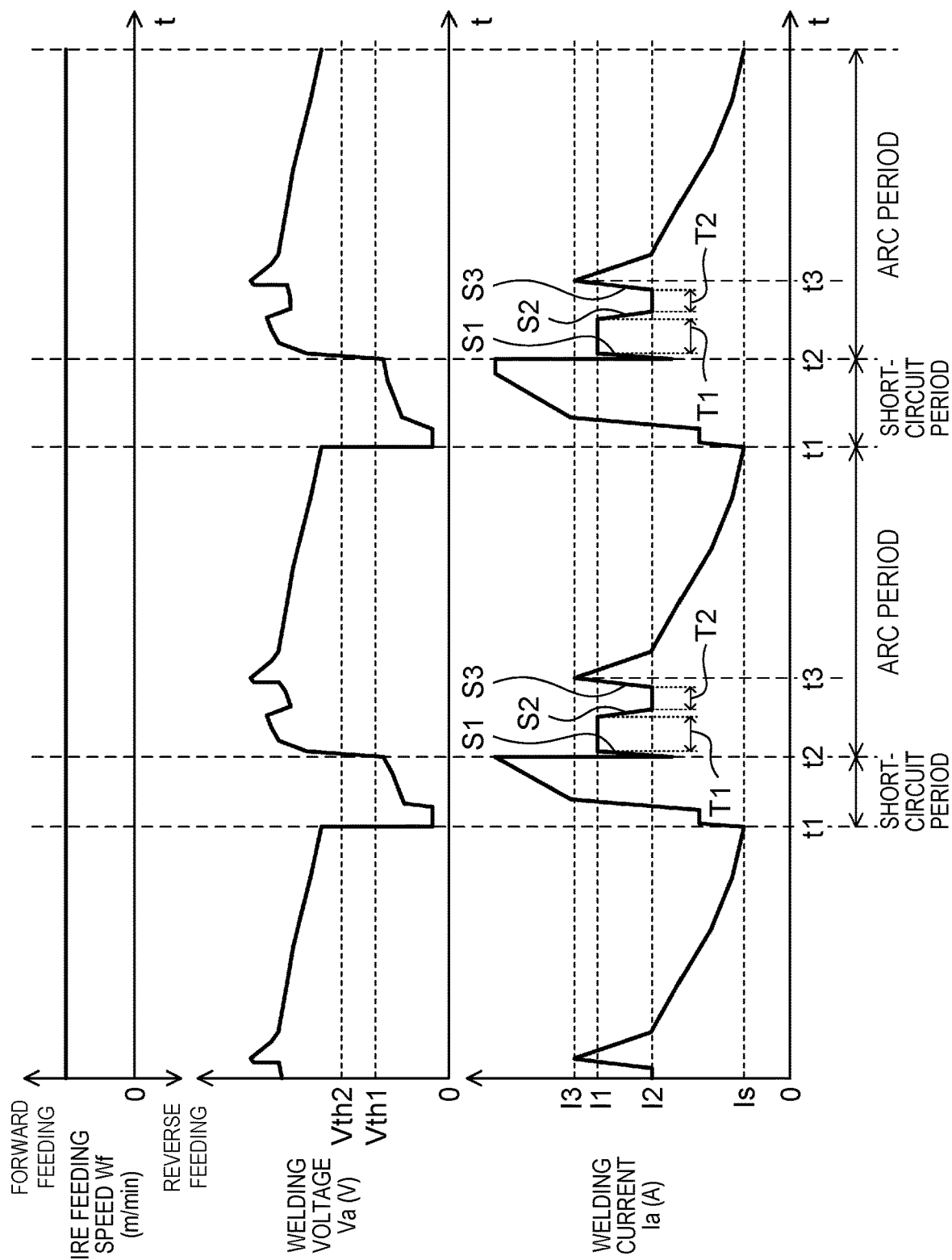
FIG. 2 is a graph showing output waveforms of a welding current, a welding voltage, and a wire feeding speed during arc welding using a shield gas containing carbon dioxide as a main component.

Reactor 21 is electrically connected to welding wire 5, and rectifies an output of second rectifier element 19 to stabilize welding current Ia (see FIG. 2).

Current detector 23 detects welding current Ia to be supplied between welding wire 5 and base material 7.

Voltage detector 25 detects welding voltage Va (see FIG. 2) to be supplied between welding wire 5 and base material 7.

Wire feeder 27 feeds welding wire 5 at a feeding speed based on an output of wire feeding speed controller 31.

Current-voltage controller 29 includes state determination unit 29a, short-circuit period controller 29b, arc period controller 29c, electronic reactor controller 29d, and drive unit 29e.

State determination unit 29a compares welding voltage Va (see FIG. 2) detected by voltage detector 25 with preset first and second threshold voltages Vth1, Vth2 (see FIG. 2) to output a state signal indicating whether a state is in the arc period or the short-circuit period. When welding voltage Va decreases to less than or equal to first threshold voltage Vth1 during the arc period, it is determined that the short-circuit occurs to fall into a short-circuit state, and then the state signal is switched to a signal indicating the short-circuit period. In contrast, when welding voltage Va increases to more than or equal to second threshold voltage Vth2 during the short-circuit period, it is determined that the short-circuit is released to fall into an arc state, and then the state signal is switched to a signal indicating the arc period.

Short-circuit period controller 29b controls welding current Ia by causing drive unit 29e to output a signal for turning on and off switching element 15 based on welding current Ia detected by current detector 23 when the state signal output by state determination unit 29a indicates the short-circuit period.

When the state signal output by state determination unit 29a indicates the arc period, arc period controller 29c performs control including: current control of causing drive unit 29e to output a signal for turning on and off switching element 15 based on welding current Ia detected by current detector 23, thereby causing welding current Ia to follow a target current value; and voltage control of causing drive unit 29e to output a signal for turning on and off switching element 15 based on welding voltage Va detected by voltage detector 25, thereby causing welding voltage Va to follow a target voltage 30) value. At the time of the voltage control, the voltage control is performed such that a value of inductance related to welding output becomes an added value of an inductance value of reactor 21 electrically connected to welding wire 5 and an inductance value determined by electronic reactor controller 29d.

Electronic reactor controller 29d determines the inductance value based on a set current of welding current Ia or a set value of wire feeding speed Wf by using a table or a mathematical expression.

Drive unit 29e outputs a signal for turning on and off switching element 15 under control of short-circuit period controller 29b and arc period controller 29c.

As shown in FIG. 2, wire feeding speed controller 31 outputs a signal indicating constant wire feeding speed Wf.

Hereinafter, control of welding current Ia and welding voltage Va using current-voltage controller 29 will be described in detail with reference to FIG. 2.

First, at first timing t1 after state determination unit 29a outputs the state signal indicating the short-circuit period, short-circuit period controller 29b increases welding current Ia from current value Is during the short-circuit. This causes the arc period to start at second timing t2. When the arc period starts, arc period controller 29c performs first control of increasing welding current Ia to first current value I1 at first gradient S1 and maintain welding current Ia at first current value I1 only for first period T1. This causes arc A to be generated as illustrated in FIG. 3A, so that vibration is generated in molten pool 7a by an arc force in a direction of arrow X.

First current value I1 is set to a range from 200 A to 300 A inclusive. First current value I1 is set to 200 A or more because when first current value I1 is set to less than 200 A, arc A becomes unstable due to insufficient heat input, and when first current value I1 is set to a value exceeding 300 A, excessive heat is input to welding wire 5 when droplet 5a is generated and grown at the tip of welding wire 5, thereby causing spatter to be generated from droplet 5a.

First period T1 is set to a range from 1 msec to 3 msec inclusive, and is particularly and preferably set to 2 msec. First period T1 is set to the range from 1 msec to 3 msec inclusive because when first period T1 is set to less than 1 msec, an arc length cannot be stably secured to cause a micro-short circuit to be likely to occur, and when first period T1 is set to a value exceeding 3 msec, molten pool 7a may be blown off due to excessive heat input to cause spatter to scatter.

First gradient S1 is set to a range from 200 A/msec to 400 A/msec inclusive.

Next, arc period controller 29c performs second control of reducing welding current Ia from first current value I1 to second current value I2 at second gradient S2 and maintaining welding current Ia at second current value I2 only for second period T2. At this time, although molten pool 7a vibrates with a center portion approaching droplet 5a as illustrated in FIG. 3B, welding current Ia is maintained at second current value I2 only for second period T2 to suppress the vibration of molten pool 7a generated under the first control, thereby stabilizing molten pool 7a.

Second current value I2 is set to a range from 100 A to 200 A inclusive, and is particularly and preferably set to 150 A. Second current value I2 is set to the range from 100 A to 200 A inclusive because when second current value I2 is set to less than 100 A, arc A becomes unstable due to insufficient heat input, and when second current value is set to a value exceeding 200 A, vibration of molten pool 7a is amplified due to excessive heat input. Setting second current value I2 to 150 A enables an arc length to be particularly stabilized.

Second gradient S2 is set to be smaller than first gradient S1. Specifically, second gradient S2 is set to a range from 150 A/msec to 300 A/msec inclusive, and is particularly and preferably set to 250 A/msec. Second gradient S2 is set to the range from 150 A/msec to 300 A/msec inclusive because when second gradient S2 is set to less than 150 A/msec, effect of suppressing vibration of molten pool 7a is reduced to cause a micro-short circuit to be likely to occur, and when second gradient S2 is set to a value exceeding 300 A/msec, the tip of welding wire 5 approaches molten pool 7a to cause a micro-short circuit to be likely to occur. Setting second gradient S2 to 250 A/msec enables a micro-short circuit to be effectively suppressed.

Second period T2 is set to a range from 1 msec to 1500 msec inclusive, and is particularly and preferably set to 1000 msec. Second period T2 is set to the range from 1 msec to 1500 msec inclusive because when second period T2 is set to less than 1 msec, vibration of molten pool 7a cannot be suppressed so much, and when second period T2 is set to a value exceeding 1500 msec, arc A becomes unstable due to insufficient heat input.

After that, when second period T2 elapses after welding current Ia decreases to second current value I2, arc period controller 29c performs third control of increasing welding current Ia from second current value I2 to third current value I3 higher than first current value I1 at third gradient S3. This control suppresses vibration of molten pool 7a using an arc force acting on molten pool 7a. The first control to third control is performed by the current control described above. Performing the first control to third control by the current control enables reducing change in welding current Ia due to disturbance.

Third current value I3 is set to a range from 200 A to 400 A inclusive, and is particularly and preferably set to 250 A. Third current value I3 is set to the range from 200 A to 400 A inclusive because when third current value I3 is set to less than 200 A, an arc force acting on molten pool 7a is too small to sufficiently suppress vibration of molten pool 7a, and when third current value I3 is set to a value exceeding 400 A, the arc force blows molten pool 7a to fail to sufficiently suppress the vibration of molten pool 7a. Setting third current value I3 to 250 A enables the vibration of molten pool 7a to be particularly and effectively suppressed.

Third gradient S3 is set to be smaller than first gradient S1 and larger than an absolute value of second gradient S2. That is, conditional expression (1) below is satisfied.

$$S1 > S3 > |S2| \quad (1)$$

Specifically, third gradient S3 is set to a range from 150 A/msec to 400 A/msec inclusive, and is particularly and preferably set to 300 A/msec. Third gradient S3 is set to a range from 150 A/msec to 400 A/msec inclusive because when third gradient S3 is set to less than 150) A/msec, heat input delays to increase a current control period, thereby causing arc A to be likely to be unstable, and when third gradient S3 is set to a value exceeding 150 A/msec, the heat input becomes fast to amplify vibration of molten pool 7a. Setting third gradient S3 to 300 A/msec enables the vibration of molten pool 7a to be effectively suppressed and an arc length to be stabilized.

Next, arc period controller 29c starts fourth control of reducing welding current Ia from third current value I3 within 0.5 ms from third timing t3 at which welding current Ia reaches third current value I3 under the third control. The fourth control is performed by the voltage control described above. That is, arc period controller 29c controls welding voltage Va such that welding current Ia corresponding to welding voltage Va decreases from third current value I3. The voltage control is improved in reactivity as compared with the current control, so that welding voltage Va is steeply reduced to enable welding at high speed. The fourth control is performed such that a value of inductance related to welding output becomes an added value of an inductance value of a reactor electrically connected to welding wire 5 and an inductance value determined by electronic reactor controller 29d. This enables controlling the inductance value more accurately.

The fourth control is particularly and preferably started within 0.2 ms from third timing t3. As described above, when welding current Ia is immediately reduced after having reached third current value I3 to apply a large arc force to molten pool 7a for a moment, the vibration of molten pool 7a generated under the first control can be effectively suppressed. While welding current Ia is maintained at third current value I3, an arc force pushes the center of molten pool 7a toward a side opposite to droplet 5a as illustrated in FIG. 3C. This enables suppressing a micro-short circuit between molten pool 7a and droplet 5a, reducing spatter generated by the micro-short circuit, and securing a periodical short-circuit. Additionally, welding current Ia is reduced within 0.5 ms after reaching third current value I3, so that amplification of the vibration of molten pool 7a can be suppressed by the arc force due to welding current Ia at third current value I3.

Figure 3D:
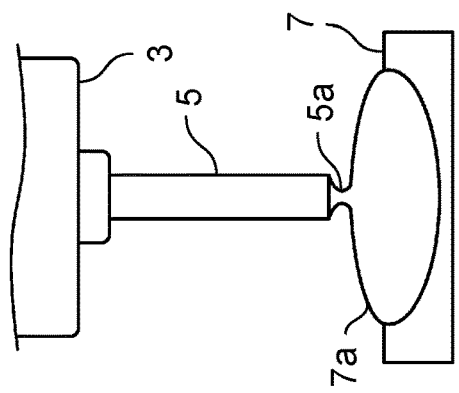
FIG. 3D is a front view corresponding to FIG. 3A at the end of fourth control.
Figure 3C:
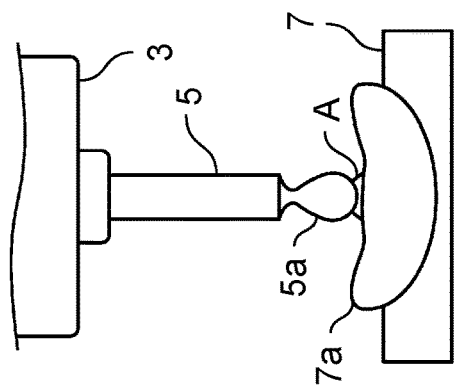
FIG. 3C is a front view corresponding to FIG. 3A at third timing.
Figure 3B:
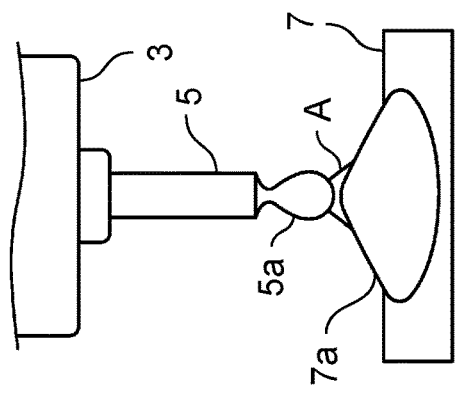
FIG. 3B is a front view corresponding to FIG. 3A during a second period.
Figure 3A:
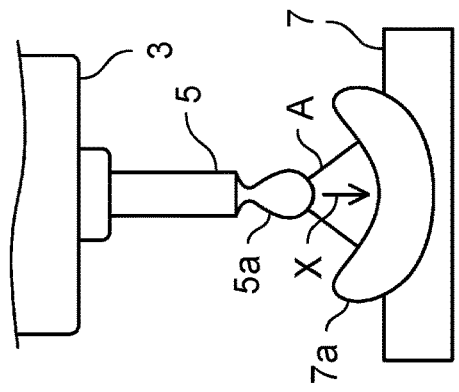
FIG. 3A is a front view illustrating a periphery of a welded portion during a first period.

When the fourth control is continued for a while, droplet 5a of welding wire 5 comes into contact with molten pool 7a as illustrated in FIG. 3D, and then the short-circuit period starts. After that, when the arc period starts again, current-voltage controller 29 repeats the first control to fourth control. The first control to fourth control are performed once in each arc period. Although in the present exemplary embodiment, the third control and the fourth control are each performed once in each arc period, the third control and the fourth control may be each performed twice or more. The number of times of the third control and the fourth control in each arc period is preferably as small as possible from the viewpoint of lead time (production tact) of a welding step.

Although in the present exemplary embodiment, welding is performed with torch 3 held by an operator, the welding may be performed with torch 3 held by a robot.

INDUSTRIAL APPLICABILITY

The arc welding control method and the arc welding device of the present disclosure can reduce spatter generated during arc welding using a shield gas containing carbon dioxide as a main component, and are respectively useful as an arc welding control method and an arc welding device in each of which a welding current is controlled in short-circuit arc welding.

REFERENCE MARKS IN THE DRAWINGS 1 arc welding device
5 welding wire
7 base material
21 reactor
23 current detector
25 voltage detector
29 current-voltage controller
29d electronic reactor controller
Ia welding current
I1 first current value
S1 first gradient
T1 first period
I2 second current value
S2 second gradient
T2 second period
I3 third current value
S3 third gradient
Wf wire feeding speed

The invention claimed is:

1. A method comprising:
operating an arc welding device to perform arc welding by alternately repeating a short-circuit period and an arc period as a main component while feeding a welding wire to a base material at a constant wire feeding speed using a shield gas containing carbon dioxide,
wherein the operating of the arc welding device includes:
automatically starting, by a controller of the arc welding device, at least one arc period by increasing a welding current in the short-circuit period based on a welding voltage detected by a voltage detector of the arc welding device and a welding current detected by a current detector of the arc welding device; and
in the at least one arc period:
automatically increasing, by the controller of the arc welding device, the welding current to a first current value at a first gradient and automatically maintaining the welding current at the first current value for a first period;
automatically reducing, by the controller of the arc welding device, the welding current from the first current value to a second current value at a second gradient and automatically maintaining the welding current at the second current value for a second period;
automatically increasing, by the controller of the arc welding device, the welding current from the second current value to a third current value at a third gradient; and
automatically starting to reduce, by the controller of the arc welding device, the welding current from the third current value within a third period, which is shorter than the first period, after the welding current reaches the third current value.

2. The according to claim 1, wherein the controller of the arc welding device automatically starts to reduce the welding current from the third current value within 0.2 ms after the welding current reaches the third current value.

3. The method according to claim 1, wherein:
the arc period is one of a plurality of arc periods; and
in each of the plurality of arc periods:
the controller of the arc welding device automatically increases the welding current from the second current value to the third current value at the third gradient; and
the controller of the arc welding device automatically starts to reduce the welding current from the third current value within the third period after the welding current reaches the third current value.

4. The method according to claim 1, wherein:
the first gradient is S1;
an absolute value of the second gradient is |S2|;
the third gradient is S3; and
S1>S3>S2.

5. The method according to claim 1, wherein:
by current control, the controller of the arc welding device automatically controls the welding current in the short-circuit period;
by current control, the controller of the arc welding device automatically increases the welding current to the first current value at the first gradient and automatically maintains the welding current at the first current value for the first period;
by current control, the controller of the arc welding device automatically reduces the welding current from the first current value to the second current value at the second gradient and automatically maintains the welding current at the second current value for the second period;
by current control, the controller of the arc welding device automatically increases the welding current from the second current value to the third current value at the third gradient; and
by voltage control, the controller of the arc welding device automatically starts to reduce the welding current from the third current value within the third period after the welding current reaches the third current value.

6. The method according to claim 5, wherein a value of inductance related to a welding output during the voltage control is an added value of a first inductance value of a reactor electrically connected to the welding wire and a second inductance value determined by an electronic reactor controller.

7. An arc welding device for performing arc welding by alternately repeating a short-circuit period and an arc period as a main component while feeding a welding wire toward a base material at a constant wire feeding speed using a shield gas containing carbon dioxide, the arc welding device comprising:
a voltage detector configured to detect a welding voltage;
a current detector configured to detect a welding current; and
a controller configured to:
start at least one arc period by increasing the welding current in the short-circuit period based on the welding voltage detected by the voltage detector and the welding current detected by the current detector; and
in the at least one arc period:
increase the welding current to a first current value at a first gradient and maintain the welding current at the first current value for a first period;
reduce the welding current from the first current value to a second current value at a second gradient and maintain the welding current at the second current value for a second period;
increase the welding current from the second current value to a third current value at a third gradient; and
start to reduce the welding current from the third current value within a third period, which is shorter than the first period, after the welding current reaches the third current value.

8. The arc welding device according to claim 7, wherein the controller is configured to, in the at least one arc period, start to reduce the welding current from the third current value within 0.2 ms after the welding current reaches the third current value.

9. The arc welding device according to claim 7, wherein:
the arc period is one of a plurality of arc periods; and
the controller is configured to, in each of the plurality of arc periods:
increase the welding current from the second current value to the third current value at the third gradient; and
start to reduce the welding current from the third current value within the third period after the welding current reaches the third current value.

10. The arc welding device according to claim 7, wherein:
the first gradient is S1;
an absolute value of the second gradient is |S2|;
the third gradient is S3; and
S1>S3>|S2|.

11. The arc welding device according to claim 7, wherein the controller is configured to:
by current control, control the welding current in the short-circuit period;

by current control, increase the welding current to the first current value at the first gradient and maintain the welding current at the first current value for the first period;

by current control, reduce the welding current from the first current value to the second current value at the second gradient and maintain the welding current at the second current value for the second period;

by current control, increase the welding current from the second current value to the third current value at the third gradient; and by voltage control, start to reduce the welding current from the third current value within the third period after the welding current reaches the third current value.

12. The arc welding device according to claim 11, wherein the controller is configured to perform the voltage control such that a value of inductance related to a welding output during the voltage control is an added value of a first inductance value of a reactor electrically connected to the welding wire and a second inductance value determined by an electronic reactor controller.

13. The arc welding device according to claim 7, wherein the third period is 0.5 ms.

14. The arc welding device according to claim 7, wherein the first current value is in a range from 200 A to 300 A inclusive.

15. The arc welding device according to claim 7, wherein the third current value is higher than the first current value.

16. The method according to claim 1, wherein the third period is 0.5 ms.

17. The method according to claim 1, wherein the first current value is in a range from 200 A to 300 A inclusive.

18. The method according to claim 1, wherein the third current value is higher than the first current value.

* * * * *